United States Patent
Zeng et al.

(10) Patent No.: US 10,218,547 B2
(45) Date of Patent: Feb. 26, 2019

(54) FILTERED ORTHOGONAL BINARY PHASE SHIFT KEYING MODULATION WITH LOW PEAK-TO-AVERAGE-POWER RATIO

(71) Applicant: QUALCOMM Incorporated, San Diego, CA (US)

(72) Inventors: Wei Zeng, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/429,730

(22) Filed: Feb. 10, 2017

(65) Prior Publication Data
US 2017/0295047 A1  Oct. 12, 2017

Related U.S. Application Data

(60) Provisional application No. 62/320,353, filed on Apr. 8, 2016.

(51) Int. Cl.
*H04L 27/20* (2006.01)
*H04L 27/26* (2006.01)
*H04L 27/34* (2006.01)
*H04L 1/00* (2006.01)

(52) U.S. Cl.
CPC ............ *H04L 27/20* (2013.01); *H04L 1/0033* (2013.01); *H04L 27/2078* (2013.01);
(Continued)

(58) Field of Classification Search
CPC ....... H04L 1/0033; H04L 27/18; H04L 27/20; H04L 27/2053; H04L 27/206;
(Continued)

(56) References Cited

U.S. PATENT DOCUMENTS 5,619,526 A * 4/1997 Kim ................... H04B 1/707
370/209
6,377,539 B1 * 4/2002 Kang .................. H04J 13/0022
370/203
(Continued)

OTHER PUBLICATIONS

Dinis et al., "SC-FDE with OQPSK-Type Schemes: An Efficient Transmission Technique for Broadband Wireless Systems," Proceedings of 18th International Conference on Computer Communications and Networks, ICCCN 2009, Aug. 3, 2009, 6 pgs., XP031527796, ISBN: 978-1-4244-4581-3, Institute of Electrical and Electronics Engineers, Piscataway, NJ, USA.
(Continued)

Primary Examiner — Young T Tse
(74) Attorney, Agent, or Firm — Holland & Hart LLP/Qualcomm

(57) ABSTRACT

Methods, systems, and devices for wireless communications are described. A transmitting device may modulate a first binary sequence using binary phase shift keying on a first axis of a complex plane. The device may modulate a second binary sequence using binary phase shift keying on a second plane of a complex axis. The first axis and the second axis may be orthogonal. The device may transmit the first binary sequence and the second binary sequence according to the modulation of the first binary sequence and the second binary sequence.

21 Claims, 10 Drawing Sheets

(52) U.S. Cl.
CPC ...... *H04L 27/2607* (2013.01); *H04L 27/2627* (2013.01); *H04L 27/2698* (2013.01); *H04L 27/3411* (2013.01); *H04L 27/2614* (2013.01); *H04L 27/2636* (2013.01)

(58) Field of Classification Search
CPC ............. H04L 27/2082; H04L 27/2085; H04L 27/2607; H04L 27/2626; H04L 27/2627; H04L 27/2078; H04L 27/2614; H04L 27/2636; H04L 27/2698; H04L 27/3411
USPC ....... 375/146, 279–281, 285, 296, 297, 308, 375/260; 332/103, 144; 455/42, 114, 2, 455/114.3
See application file for complete search history.

(56) References Cited

U.S. PATENT DOCUMENTS

| | | | |
|---|---|---|---|
| 8,705,658 B2* | 4/2014 | Seo ..................... | H04L 27/2085 375/219 |
| 2008/0031376 A1* | 2/2008 | Ban ..................... | H04L 27/2602 375/271 |
| 2009/0060090 A1* | 3/2009 | Ban ..................... | H04L 5/0007 375/308 |
| 2010/0002784 A1* | 1/2010 | Hlinka ................ | H04L 27/2615 375/260 |
| 2011/0134809 A1* | 6/2011 | Yu ........................ | H04L 5/0048 370/277 |

OTHER PUBLICATIONS

ISA/EP, International Search Report and Written Opinion of the International Searching Authority, Int'l Application No. PCT/US2017/017818, dated May 16, 2017, European Patent Office, Rijswijk, NL, 16 pgs.

Kuh et al., "Continuous Phase Quadrature Phase Shift Keyed (CPQPSK) Signaling Technique," 21st Century Military Communications—What's Possible?, Conference Record, 1988 IEEE Military Communications Conference, San Diego, CA, Oct. 23-26, 1988, pp. 157-161, vol. 1 of 3, XP000012474, Institute of Electrical and Electronics Engineers, Piscataway, NJ, USA.

Phoel et al., "Improved Performance of Multiple-Symbol Differential Detection for Offset QPSK," Wireless Communications and Networking Conference, WCNC, 2004 IEEE Atlanta, GA, USA, Mar. 21-25, 2004, pp. 548-553, XP010708102, DOI: 10.1109/WCNC.2004.1311604, ISBN: 978-0-7803-8344-9, vol. 1, Institute of Electrical and Electronics Engineers, Piscataway, NJ, USA.

Qualcomm Incorporated, "RSMA," 3GPP TSG-RAN WG1 Meeting #85, R1-164688, Nanjing, China, May 23-27, 2016, 8 pgs., XP051089945, 3rd Generation Partnership Project, Mobile Competence Centre; 650, Route Des Lucioles; F-06921 Sophia-Antipolis Cedex, France.

Interdigital Communications: "Waveform Design Considerations for Carrier Frequencies above 40 GHz", 3GPP Draft; R1-1609889 waveform design Considerations for Carrier Frequencies above 40GHZ, 3rd Generation Partnership Project (3GPP), Mobile Competence Centre; 650, Route Des Lucioles; F-06921 Soph, vol. RAN WG1, No. Lisbon, Portugal; Oct. 13, 2016-Oct. 14, 2016, Oct. 1, 2016 (Oct. 1, 2016), pp. 1-8, XP051159720, Retrieved from the Internet: URL:http://www.3gpp.org/ftp/tsg_ran/WG1_RL1/TSGR1_86b/Docs/ [retrieved on Oct. 1, 2016].

IPEA/EP, Second Written Opinion of the International Preliminary Examining Authority, Int'l Application No. PCT/US2017/017818, dated Mar. 7, 2018, European Patent Office, Berlin, DE, 10 pgs.

* cited by examiner

FILTERED ORTHOGONAL BINARY PHASE SHIFT KEYING MODULATION WITH LOW PEAK-TO-AVERAGE-POWER RATIO

CROSS REFERENCES

The present Application for patent claims priority to U.S. Provisional Patent Application No. 62/320,353 by Zeng, et al., entitled "Filtered Orthogonal binary Phase Shift Keying Modulation With Low Peak-To-Average-Power Ratio," filed Apr. 8, 2016, assigned to the assignee hereof.

BACKGROUND

Field of the Disclosure

The present disclosure, for example, relates to wireless communication systems, and more particularly to orthogonal binary phase shift keying modulation.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Wireless communication systems may include a large population of a particular class of devices, such as devices that transmit relatively small amounts of data, transmit data infrequently, etc., via the wireless communication systems. Such devices may include machine type communication (MTC) devices, smart sensors/meters, environmental/medical monitoring devices, internet-of-everything (IoE) devices, etc. These devices may also be characterized as having a limited available power supply, reduced or limited coverage areas, e.g., due to the deployment and/or mobility considerations, etc. These devices may benefit from high power amplifier efficiency and/or low peak-to-average power ratios.

SUMMARY

The described techniques relate to improved systems, methods, and/or devices that support orthogonal binary phase shift keying (PSK) modulation. A transmitting device (e.g., a "transmitter") may receive a stream of binary information to be transmitted. The transmitter may modulate a first binary sequence using binary phase shift keying (BPSK) on a first axis of a complex plane, e.g., on a real or in-phase axis, and modulate a second binary sequence using a BPSK on a second axis of the plane, e.g., on an imaginary or quadrature axis. The first axis and the second axis may be orthogonal with respect to each other, e.g., may be perpendicular or separated by a ninety degree phase shift. The transmitter may transmit the binary sequences based on the modulation. Thus, the transmitter may apply an orthogonal BPSK modulation to different binary sequences of the transmitted information before transmission. In some examples, the transmitter may smooth the modulated binary sequences before transmission using a filter, such as a finite impulse response (FIR) filter. A receiving device (e.g., a "receiver") receives the modulated binary sequences from the transmitter, e.g., the first and second binary sequences, and decodes or demodulates the binary sequences.

In some aspects, the transmitter may apply an offset quadrature phase shift keying (OQPSK) technique. For example, the transmitter may modulate a binary sequence using the OQPSK and smooth the modulated binary sequence using the FIR filter. The transmitter may transmit the modulated and smoothed binary sequence.

A method of wireless communication is described. The method may include modulating a first binary sequence using binary phase shift keying on a first axis of a complex plane, modulating a second binary sequence using binary phase shift keying on a second axis of the complex plane, wherein the first axis and the second axis are substantially orthogonal and transmitting the first binary sequence and the second binary sequence based at least in part on the modulation of the first binary sequence and the second binary sequence.

An apparatus for wireless communication is described. The apparatus may include means for modulating a first binary sequence using binary phase shift keying on a first axis of a complex plane, means for modulating a second binary sequence using binary phase shift keying on a second axis of the complex plane, wherein the first axis and the second axis are substantially orthogonal and means for transmitting the first binary sequence and the second binary sequence based at least in part on the modulation of the first binary sequence and the second binary sequence.

A further apparatus is described. The apparatus may include a processor, memory in electronic communication with the processor, and instructions stored in the memory. The instructions may be operable to cause the processor to modulate a first binary sequence using binary phase shift keying on a first axis of a complex plane, modulate a second binary sequence using binary phase shift keying on a second axis of the complex plane, wherein the first axis and the second axis are substantially orthogonal and transmit the first binary sequence and the second binary sequence based at least in part on the modulation of the first binary sequence and the second binary sequence.

A non-transitory computer readable medium for wireless communication is described. The non-transitory computer-readable medium may include instructions to cause a processor to modulate a first binary sequence using binary phase shift keying on a first axis of a complex plane, modulate a second binary sequence using binary phase shift keying on a second axis of the complex plane, where the first axis and the second axis are substantially orthogonal and transmit the first binary sequence and the second binary sequence based on the modulation of the first binary sequence and the second binary sequence.

Some examples of the method, apparatus, or non-transitory computer-readable medium described above may further include processes, features, means, or instructions for smoothing the modulated first binary sequence and the modulated second binary sequence using a finite impulse response (FIR) filter prior to transmitting. Some examples of the method, apparatus, or non-transitory computer-readable medium described above may further include processes, features, means, or instructions for applying a cyclic prefix (CP) to the first binary sequence and the second binary sequence.

In some examples of the method, apparatus, or non-transitory computer-readable medium described above, the CP is applied based on a common block size for the first binary sequence and the second binary sequence. In some examples of the method, apparatus, or non-transitory computer-readable medium described above, the CP is applied prior to modulating the first binary sequence and the second binary sequence.

In some examples of the method, apparatus, or non-transitory computer-readable medium described above, modulating the first binary sequence on the first axis and modulating the second binary sequence on the second axis comprises: limiting an incremental phase shift between the first binary sequence and the second binary sequence to below a threshold level. In some examples of the method, apparatus, or non-transitory computer-readable medium described above, the threshold level comprises a ninety degrees phase shift.

In some examples of the method, apparatus, or non-transitory computer-readable medium described above, the first axis comprises a real axis and the second axis comprises an imaginary axis. In some examples of the method, apparatus, or non-transitory computer-readable medium described above, the first axis comprises an imaginary axis and the second axis comprises a real axis. Some examples of the method, apparatus, or non-transitory computer-readable medium described above may further include processes, features, means, or instructions for obtaining the first binary sequence and the second binary sequence from a single binary stream. In some examples of the method, apparatus, or non-transitory computer-readable medium described above, the first binary sequence comprises a set of even bits in the single binary stream and the second binary sequence comprises a set of odd bits in the single binary stream.

A method of wireless communication is described. The method may include receiving a first binary sequence modulated using binary phase shift keying on a first axis of a complex plane, receiving a second binary sequence modulated using binary phase shift keying on a second axis of the complex plane, wherein the first axis and the second axis are substantially orthogonal and demodulating the first binary sequence and the second binary sequence based at least in part on the modulation.

An apparatus for wireless communication is described. The apparatus may include means for receiving a first binary sequence modulated using binary phase shift keying on a first axis of a complex plane, means for receiving a second binary sequence modulated using binary phase shift keying on a second axis of the complex plane, wherein the first axis and the second axis are substantially orthogonal and means for demodulating the first binary sequence and the second binary sequence based at least in part on the modulation.

A further apparatus is described. The apparatus may include a processor, memory in electronic communication with the processor, and instructions stored in the memory. The instructions may be operable to cause the processor to receive a first binary sequence modulated using binary phase shift keying on a first axis of a complex plane, receive a second binary sequence modulated using binary phase shift keying on a second axis of the complex plane, wherein the first axis and the second axis are substantially orthogonal and demodulate the first binary sequence and the second binary sequence based at least in part on the modulation.

A non-transitory computer readable medium for wireless communication is described. The non-transitory computer-readable medium may include instructions to cause a processor to receive a first binary sequence modulated using binary phase shift keying on a first axis of a complex plane, receive a second binary sequence modulated using binary phase shift keying on a second axis of the complex plane, where the first axis and the second axis are substantially orthogonal and demodulate the first binary sequence and the second binary sequence based on the modulation.

In some examples of the method, apparatus, or non-transitory computer-readable medium described above, the first axis comprises a real axis and the second axis comprises an imaginary axis. In some examples of the method, apparatus, or non-transitory computer-readable medium described above, the first axis comprises an imaginary axis and the second axis comprises a real axis. Some examples of the method, apparatus, or non-transitory computer-readable medium described above may further include processes, features, means, or instructions for combining the first binary sequence and the second binary sequence into a single binary stream. In some examples of the method, apparatus, or non-transitory computer-readable medium described above, the first binary sequence comprises a set of even bits in the single binary stream and the second binary sequence comprises a set of odd bits in the single binary stream.

A method of wireless communication is described. The method may include modulating a binary sequence using phase shift keying, smoothing the modulated binary sequence using a finite impulse response (FIR) filter and transmitting the binary sequence based at least in part on the modulation and smoothing.

An apparatus for wireless communication is described. The apparatus may include means for modulating a binary sequence using phase shift keying, means for smoothing the modulated binary sequence using a finite impulse response (FIR) filter and means for transmitting the binary sequence based at least in part on the modulation and smoothing.

A further apparatus is described. The apparatus may include a processor, memory in electronic communication with the processor, and instructions stored in the memory. The instructions may be operable to cause the processor to modulate a binary sequence using phase shift keying, smooth the modulated binary sequence using a finite impulse response (FIR) filter and transmit the binary sequence based at least in part on the modulation and smoothing.

A non-transitory computer readable medium for wireless communication is described. The non-transitory computer-readable medium may include instructions to cause a processor to modulate a binary sequence using phase shift keying, smooth the modulated binary sequence using a finite impulse response (FIR) filter and transmit the binary sequence based on the modulation and smoothing.

Some examples of the method, apparatus, or non-transitory computer-readable medium described above may further include processes, features, means, or instructions for applying a cyclic prefix (CP) to the binary sequence. In some examples of the method, apparatus, or non-transitory computer-readable medium described above, the CP is applied prior to modulating the binary sequence. In some examples of the method, apparatus, or non-transitory computer-readable medium described above, the phase shift keying comprises offset quadrature phase shift keying.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
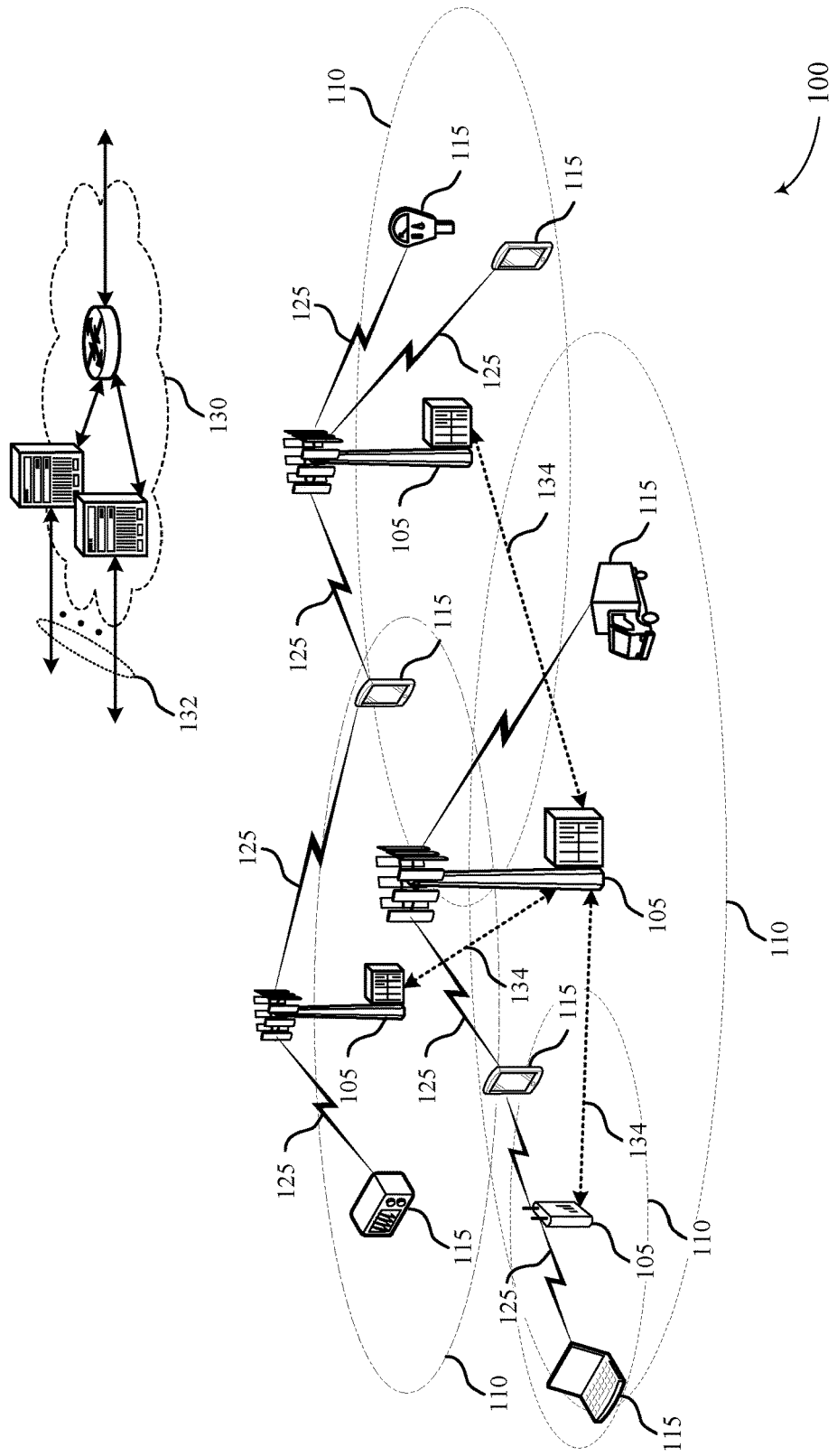
FIG. 1 shows a block diagram of a wireless communication system, in accordance with various aspects of the present disclosure.

Wireless communication systems may be configured to support conventional communication devices, such as user equipment (UEs), tablets, etc., that communicate using a wide variety of information, using differing communication scenarios, etc. Other devices, however, may support a tailored communication technique that, while suitable to conventional wireless communication systems, may not utilize all the typical resources and/or have the same considerations. For example, certain devices may operate with a limited available power, e.g., small battery, infrequent recharges, etc., may transmit data rarely (e.g., once per day, week, month, etc.), may transmit small amounts of data at a time, etc. For such devices, power conservation may be a higher priority than spectral efficiency. Additionally, due to deployment scenarios, environmental factors, etc., such devices may support predefined transmission characteristics to ensure successful communications.

Aspects of the disclosure are initially described in the context of a wireless communication system. Aspects of the present disclosure relate to devices that utilize orthogonal BPSK modulation techniques that supports low peak-to-average-power ratio (PAPR). A transmitting device ("transmitter") receives a binary stream of information to be transmitted. The transmitter separates the binary stream into first and second binary sequences (e.g., even and odd binary sequences). The transmitter modulates the first binary sequence using BPSK on a first axis of a complex plane, e.g., on the vertical axis of the complex plane. The transmitter modulates the second binary sequence using BPSK on a second axis of the complex plane, e.g., on a horizontal axis of the complex plane. The first and second axis of the complex plane are orthogonal with respect to each other, e.g., separated my ninety degrees. The transmitter transmits the first and second binary sequences according to the modulation. A receiving device ("receiver") receives and demodulates the first and second binary sequences. For example, the receiver demodulates the BPSK modulated first binary sequence from the first plane of the complex axis and the BPSK modulated second binary sequence from the second plane of the complex axis. The receiver combines the first and second binary sequences and output the data to other components, layers, applications, etc., of the receiving device.

In some aspects, the transmitter uses an offset quadrature phase shift keying (OQPSK) modulation for the binary stream of data and smooths the modulated data using an FIR filter. The transmitter, in some examples, applies a cyclic prefix (CP) to the binary stream before modulation with the OQPSK.

The described functions may be performed in a variety of combinations, implementations, etc. For example, certain described functions may be omitted from a described configuration, rearranged from the described order, substituted with other described functions, etc. Accordingly, it is to be understood that the certain described functions are capable of being implemented in different orders, in different combinations, etc., with other described functions, and are not limited to the particular described configuration.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130.

The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a MTC, an IoE device, a sensor device, a monitoring device, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, wireless communications system 100 may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communications systems, transmissions from the UEs 115 may be beamformed. Thus, uplink control channels may be received at a base station 105 in a directional manner from multiple UEs.

In some aspects, UEs 115 may be configured to support filtered orthogonal BPSK modulation with low PAPR. For example, a UE 115 may support transmitting and/or receiving signals that are modulated according to the described techniques. UEs 115 may have information to transmit and modulate two binary sequences using BPSK, where each binary sequence is modulated on an axis that is orthogonal to the other binary sequence. For example, a first binary sequence may be BPSK modulated on a first axis of a complex plane and a second binary sequence may be BPSK modulated on a second axis of the complex plane. The first axis may be a real or in-phase axis and the second axis may be an imaginary or quadrature axis of the plane. Alternatively, the first axis may be the imaginary or quadrature axis and the second axis may be the real or in-phase axis of the plane. The UE 115 may transmit the orthogonal BPSK binary sequences to a receiving device.

A different UE 115, a base station 105, etc., may be a receiving device and receive the transmitted information. For example, the receiving UE 115 may receive the first binary sequence modulated using BPSK on the first axis and the second binary sequence modulated using BPSK on the second axis. The receiving UE 115 may demodulate the first and second binary sequences according to the orthogonal BPSK modulation.

In some aspects, a transmitting UE 115 may modulate a binary sequence using OQPSK modulation. The transmitting UE 115 may smooth the modulated binary sequence using a FIR filter and transmit the binary sequence using according to the modulation and smoothing.

Figure 2:
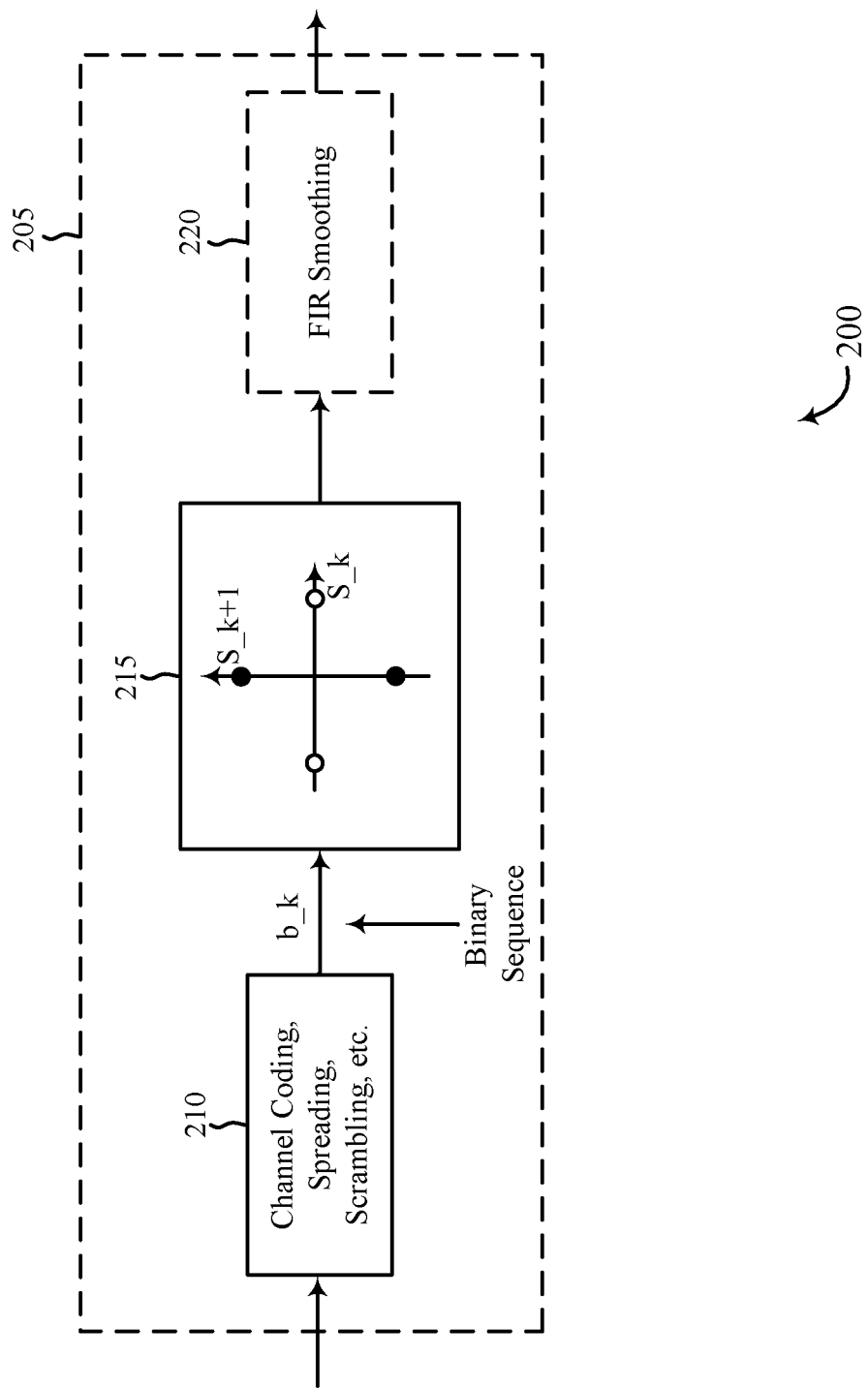
FIG. 2 shows a block diagram of aspects of a device that supports orthogonal binary phase shift keying modulation, in accordance with various aspects of the present disclosure.

FIG. 2 shows a block diagram 200 of aspects of a device 205 that supports orthogonal BPSK modulation, in accordance with various aspects of the present disclosure. Device 205 may be an example of aspects of a transmitting device, such as a UE 115, a base station, 105, etc., described with reference to FIG. 1. In some examples, device 205 may be implemented as a transmitter, or a component of a transmitter. Device 205 may support the described orthogonal BPSK modulation techniques and may optionally include signal smoothing using an FIR filter. Device 205 may include a source component 210, an orthogonal BPSK modulator 215, and an optional FIR filter 220.

Source component 210 may refer, at least in certain aspects, to a baseband processing function of a transmitter. For example, the source component 210 may include channel coding functions, channel spreading functions, scrambling functions, etc., such as is used on conventional transmitter pre-modulation systems. The source component 210 may output a single binary stream or sequence (identified as "b_k"). The binary sequence may include bits of information to be transmitted from device 205.

The orthogonal BPSK modulator 215 may receive the binary sequence from source component 210 and map the binary sequence for orthogonal BPSK modulation. For example, the orthogonal BPSK modulator 215 may separate the binary sequence into two binary sequences, e.g., at the bit level, at the block level, or some other predetermined number of bits. The first binary sequence may include a set of even bits of the single binary stream and the second binary sequence may include odd bits of the single binary stream. The first binary sequence may be mapped to a real axis of a complex plane, e.g., a horizontal axis, and the second binary sequence may be mapped to an imaginary axis of the complex plane, e.g., a vertical axis. The first and second axes may be orthogonal with respect to each other. In some examples, the first axis may be separated or orthogonal from the second axis of the complex plane by a ninety degrees phase shift.

The orthogonal BPSK modulator 215 may BPSK modulate the first and second binary sequences according to the mapping. For example, the orthogonal BPSK modulator 215 may modulate the first binary sequence using BPSK on the first axis and modulate the second binary sequence using BPSK on the second axis of the complex plane. The BPSK modulated first binary sequence may be identified as "S_k" and the BPSK modulated second binary sequence may be identified as "S_k+1". BPSK modulating the first and second binary sequences on the respective axes limits an incremental shift between the first binary sequence and the second binary sequence to below a threshold level. In the example where the axes are ninety degrees orthogonal to each other, the threshold level may be a ninety degree phase shift. BPSK modulating the first and second binary sequences according to the orthogonal mapping may eliminate inter-symbol interference (ISI) even when an FIR smoothing filter is utilized, avoid a zero-crossing effect, and the like. Eliminating and/or reducing the inter-symbol interference enables use of a less complex receiver design, e.g., the receiver may use a simpler equalizer, less memory, etc., to receive and demodulate the modulated binary sequences. Moreover, BPSK modulating the first and second binary sequences according to the orthogonal mapping may reduce the PAPR of the transmitted signal, e.g., when compared to other PSK modulating techniques, and improve power amplifier efficiency.

The FIR filter 220 may be optional (as indicated by dashed lines) and may smooth the orthogonal BPSK modulated first and second binary sequences prior to transmission. For example, the FIR filter 220 may have an impulse response that is finite in duration, e.g., due to the FIR filter settling to zero in finite time. Thus, the FIR filter 220 may smooth out any phase discontinuity of the orthogonal BPSK modulated first binary sequence and/or second binary sequence.

Figure 3:
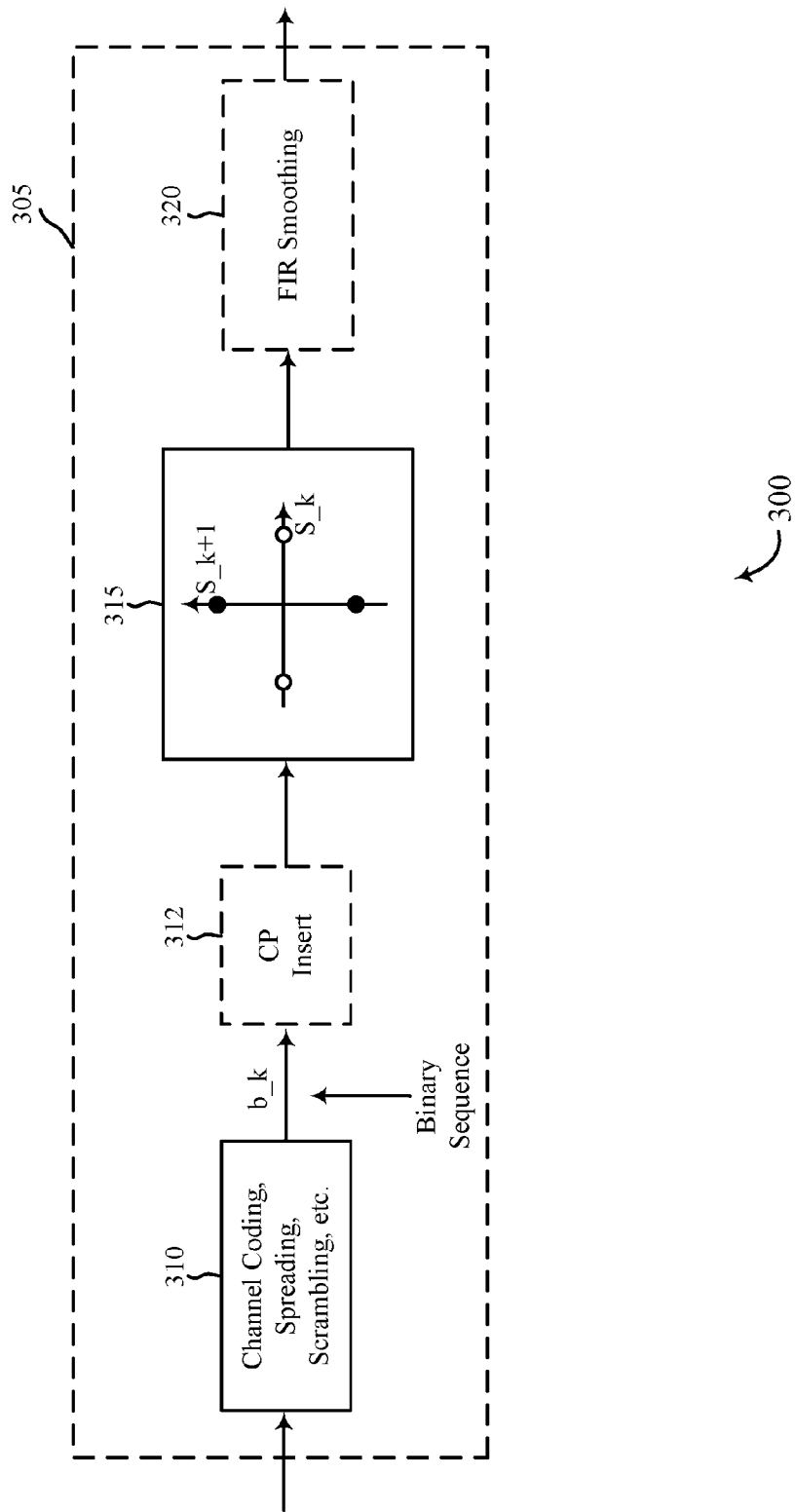
FIG. 3 shows a block diagram of aspects of a device that supports orthogonal binary phase shift keying modulation, in accordance with various aspects of the present disclosure.

FIG. 3 shows a block diagram 300 of aspects of a device 305 that supports orthogonal BPSK modulation, in accordance with various aspects of the present disclosure. Device 305 may be an example of aspects of a transmitting device, such as a device 205, a UE 115, a base station, 105, etc., described with reference to FIGS. 1-2. In some examples, device 305 may be implemented as a transmitter, or a component of a transmitter. Device 305 may support the described orthogonal BPSK modulation techniques and may optionally include signal smoothing using an FIR filter and CP insertion prior to modulation. Device 305 may include a source component 310, a CP manager 312, an orthogonal BPSK modulator 315, and an optional FIR filter 320.

Source component 310 may refer, at least in certain aspects, to a baseband processing function of a transmitter. For example, the source component 310 may include channel coding functions, channel spreading functions, scrambling functions, etc., such as is used on conventional transmitter pre-modulation systems. The source component 310 may output a single binary stream or sequence (identified as "b_k"). The binary sequence may include bits of information to be transmitted from device 305.

CP manager 312 may insert a CP into the binary sequence received from source component 310. In some examples, the binary sequence may be divided into blocks of bits and the CP may be inserted into each block. The blocks of bits may, in some examples, be the same size. CP insertion may support equalization in the frequency domain, e.g., for channels having partial response. In some aspects, CP insertion may be optional and determined dynamically dependent upon deployment scenarios, e.g., to support coexistence for other devices. As is discussed above, BPSK modulating the first and second binary sequences according to the orthogonal mapping may eliminate ISI even when an FIR smoothing filter is utilized, avoid a zero-crossing effect, and the like. This may lead to scenarios where devices configured to support the described BPSK modulation techniques may omit CP insertion due the elimination of ISI. However, legacy devices operating on the wireless communication system may rely on CP and therefore CP manager 312 may dynamically determine whether to insert the CP.

The orthogonal BPSK modulator 315 may receive the binary sequence from CP manager 312 and map the binary sequence for orthogonal BPSK modulation. For example, the orthogonal BPSK modulator 315 may separate the binary sequence into two binary sequences, e.g., at the bit level, at the block level, or some other predetermined number of bits. In the example where the CP manager 312 divides the binary sequence into blocks, the orthogonal BPSK modulator 315 may separate the binary sequences according to the block size. The first binary sequence may include a set of even bits of the single binary stream and the second binary sequence may include odd bits of the single binary stream. The first binary sequence may be mapped to a real axis of a complex plane, e.g., a horizontal axis, and the second binary sequence may be mapped to an imaginary axis of the complex plane, e.g., a vertical axis. The first and second axes may be orthogonal with respect to each other. In some examples, the first axis may be separated or orthogonal from the second axis of the complex plane by a ninety degrees phase shift.

The orthogonal BPSK modulator 315 may BPSK modulate the first and second binary sequences according to the mapping. For example, the orthogonal BPSK modulator 315 may modulate the first binary sequence using BPSK on the first axis and modulate the second binary sequence using BPSK on the second axis of the complex plane. The BPSK modulated first binary sequence may be identified as "S_k" and the BPSK modulated second binary sequence may be identified as "S_k+1". BPSK modulating the first and second binary sequences on the respective axes limits an incremental shift between the first binary sequence and the second binary sequence to below a threshold level. In the example where the axes are ninety degrees orthogonal to each other, the threshold level may be a ninety degree phase shift. BPSK modulating the first and second binary sequences according to the orthogonal mapping may eliminate inter-symbol interference even when an FIR smoothing filter is utilized, avoid a zero-crossing effect, and the like. Moreover, BPSK modulating the first and second binary sequences according to the orthogonal mapping may reduce the PAPR of the transmitted signal, e.g., when compared to other PSK modulating techniques, and improve power amplifier efficiency.

The FIR filter 320 may be optional (as indicated by dashed lines) and may smooth the orthogonal BPSK modulated first and second binary sequences prior to transmission. For example, the FIR filter 320 may have an impulse response that is finite in duration, e.g., due to the FIR filter settling to zero in finite time. Thus, the FIR filter 320 may smooth out any phase discontinuity of the orthogonal BPSK modulated first binary sequence and/or second binary sequence.

Figure 4:
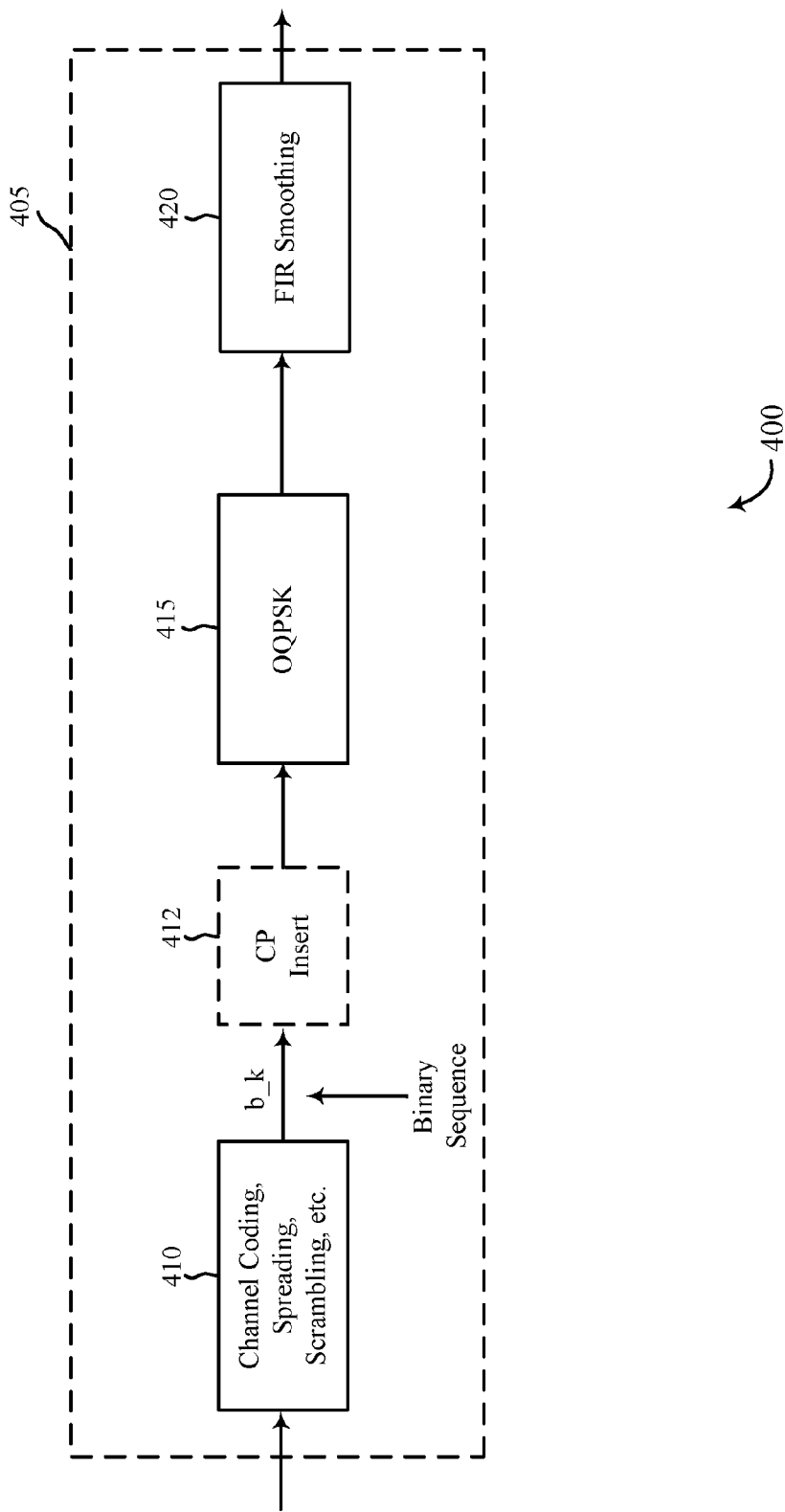
FIG. 4 shows a block diagram of aspects of a device that supports offset quadrature phase shift keying modulation, in accordance with various aspects of the present disclosure.

FIG. 4 shows a block diagram 400 of aspects of a device 405 that supports orthogonal BPSK modulation, in accordance with various aspects of the present disclosure. Device 405 may be an example of aspects of a transmitting device, such as a device 205, a device 305, a UE 115, a base station, 105, etc., described with reference to FIGS. 1-3. In some examples, device 405 may be implemented as a transmitter, or a component of a transmitter. Device 405 may support the described OQPSK modulation techniques and may include signal smoothing using an FIR filter and optionally CP insertion prior to modulation. Device 405 may include a source component 410, an optional CP manager 412, an OQPSK modulator 415, and an FIR filter 420.

Source component 410 may refer, at least in certain aspects, to a baseband processing function of a transmitter. For example, the source component 410 may include channel coding functions, channel spreading functions, scrambling functions, etc., such as is used on conventional transmitter pre-modulation systems. The source component 410 may output a single binary stream or sequence (identified as "b_k"). The binary sequence may include bits of information to be transmitted from device 305.

CP manager 412 may by optional and may insert a CP into the binary sequence received from source component 410. In some examples, the binary sequence may be divided into blocks of bits and the CP may be inserted into each block. The blocks of bits may, in some examples, be the same size. CP insertion may support equalization in the frequency domain, e.g., for channels having partial response. As discussed above, CP insertion may be optional and determined dynamically dependent upon deployment scenarios, e.g., to support coexistence for legacy devices.

The OQPSK modulator 415 may receive the binary sequence from CP manager 412 and map the binary sequence for OQPSK modulation. For example, the OQPSK modulator 415 may separate the binary sequence into two binary sequences, e.g., at the bit level. The OQPSK modulator 415 may then make one of the bit sequences (e.g., the first or second bit sequence) offset by one bit period with respect to the other bit sequence. The first binary sequence may include a set of even bits of the single binary stream and the second binary sequence may include odd bits of the single binary stream. The first binary sequence may be mapped to a real axis of a complex plane, e.g., a horizontal axis, and the second binary sequence may be mapped to an imaginary axis of the complex plane, e.g., a vertical axis. The first and second axes may be orthogonal with respect to each other. In some examples, the first axis may be separated or orthogonal from the second axis of the complex plane by a ninety degrees phase shift.

The OQPSK modulator 415 may BPSK modulate the first and second binary sequences according to the mapping. For example, the OQPSK modulator 415 may modulate the first binary sequence using PSK on the first axis and modulate the second binary sequence using PSK on the second axis of the complex plane. Modulating the first and second binary sequences on the respective axes limits an incremental shift between the first binary sequence and the second binary sequence to below a threshold level. In the example where the axes are ninety degrees orthogonal to each other, the threshold level may be a ninety degree phase shift. Modulating the first and second binary sequences according to the mapping may eliminate inter-symbol interference even when an FIR smoothing filter is utilized, avoid a zero-crossing effect, and the like. Moreover, modulating the first and second binary sequences according to the orthogonal mapping may reduce the PAPR of the transmitted signal, e.g., when compared to other PSK modulating techniques, and improve power amplifier efficiency.

The FIR filter 420 may smooth the OQPSK modulated first and second binary sequences prior to transmission. For example, the FIR filter 420 may have an impulse response that is finite in duration, e.g., due to the FIR filter settling to zero in finite time. Thus, the FIR filter 420 may smooth out any phase discontinuity of the orthogonal BPSK modulated first binary sequence and/or second binary sequence. Additionally, the described techniques may eliminate inter-symbol interference.

Figure 5:
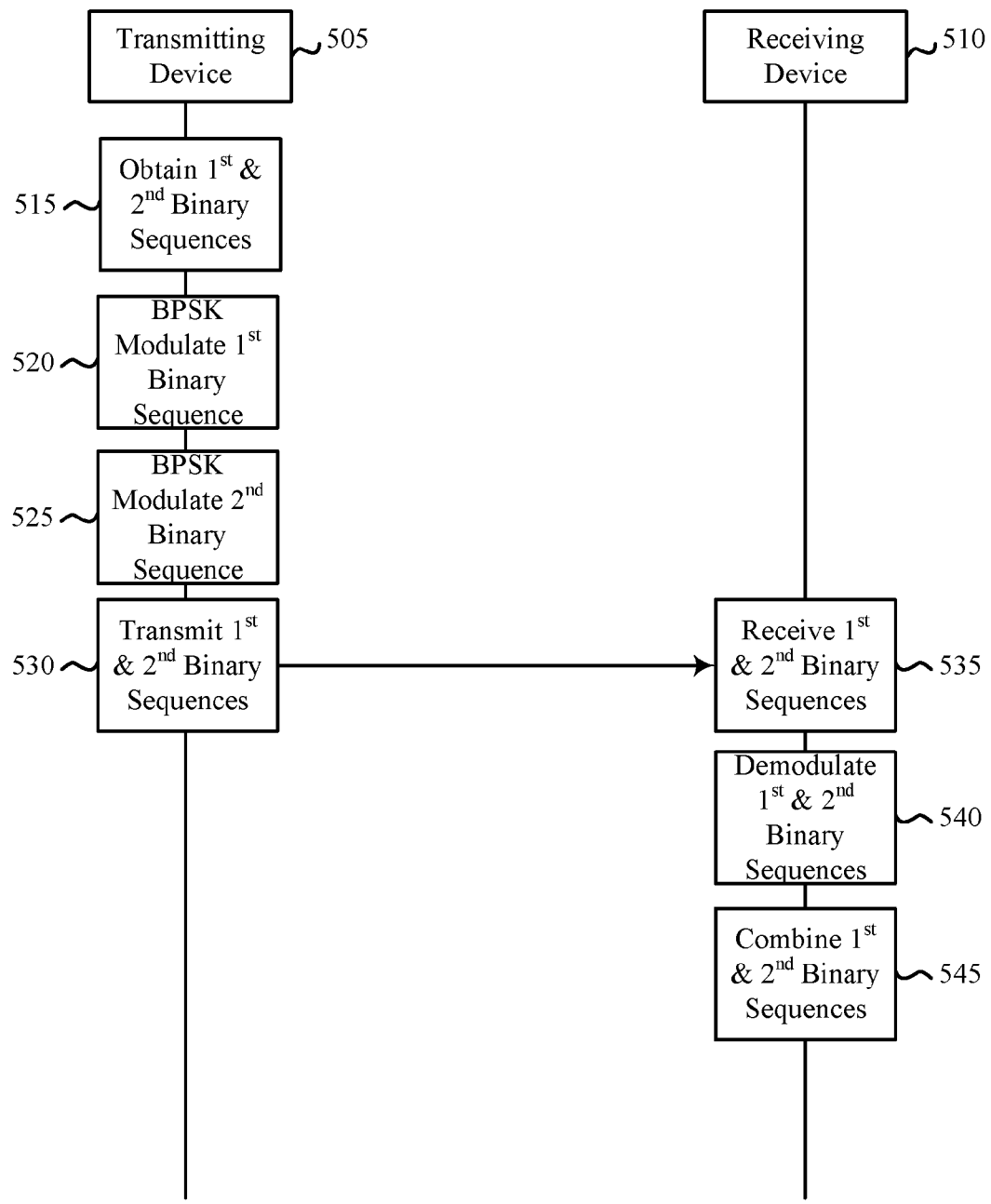
FIG. 5 shows an example process flow in a wireless communication system that supports orthogonal binary phase shift keying modulation, in accordance with various aspects of the present disclosure.

FIG. 5 shows an example process flow 500 in a wireless communication system that supports orthogonal binary phase shift keying modulation, in accordance with various aspects of the present disclosure. Process flow 500 may include a transmitting device 505 and a receiving device 510. Transmitting device 505 and/or receiving device 510 may be examples of a UE 115, a base station 105, and/or a device 205 through 405 described with reference to FIGS. 1-4, when configured as a transmitter or a receiver. In some aspects, transmitting device 505 and receiving device 510 may be components of a transmitter and a receiver, respectively.

At 515, transmitting device 505 may obtain the first and second binary sequences. For example, transmitting device 505 may obtain a single binary stream as an input to a transmitter, e.g., from a higher layer, stack, application, etc., of the transmitting device 505. The first and second binary sequences may be obtained by splitting the single binary sequence at the bit level, in some examples.

At 520, the transmitting device 505 may BPSK modulate the first binary sequence. For example, the transmitting device 505 may map the first binary sequence to a first axis of a complex plane. The first binary sequence may be an even binary sequence and the first axis of the complex plane may be a real axis.

At 525, the transmitting device 505 may BPSK modulate the second binary sequence. For example, the transmitting device 505 may map the second binary sequence to a second axis of a complex plane. The second binary sequence may be an odd binary sequence and the second axis of the complex plane may be an imaginary axis. The first and second axes of the complex plane may be orthogonal with respect to each other. In some examples, the first and second axes may be separated by a ninety degree phase shift.

At 530, the transmitting device 505 may transmit the orthogonal BPSK modulated first and second binary sequences to the receiving device 510. The first and second binary sequences may be transmitted according to the orthogonal BPSK modulation. Although not shown in process flow 500, the transmitting device 505 may optionally smooth the orthogonal BPSK modulated first and second binary sequences using an FIR filter prior to transmission.

At 535, the receiving device 510 may receive the orthogonal BPSK modulated first and second binary sequences. At 540, the receiving device 510 may demodulate the first and second binary sequences. In some examples, the receiving device may use a rake receiver to demodulate the first and second binary sequences. For example, the receiving device 510 may demodulate the first and second binary sequences using BPSK modulation techniques, noting that the binary sequences are mapped to different axes of the complex plane. When FIR filter smoothing is applied by transmitting device 505, the filtering may be transparent to the receiving device 510 and therefore may not change the BPSK demodulation procedures.

At 545, the receiving device 510 may combine the demodulated first and second binary sequences to recover the original single binary stream.

Figure 6:
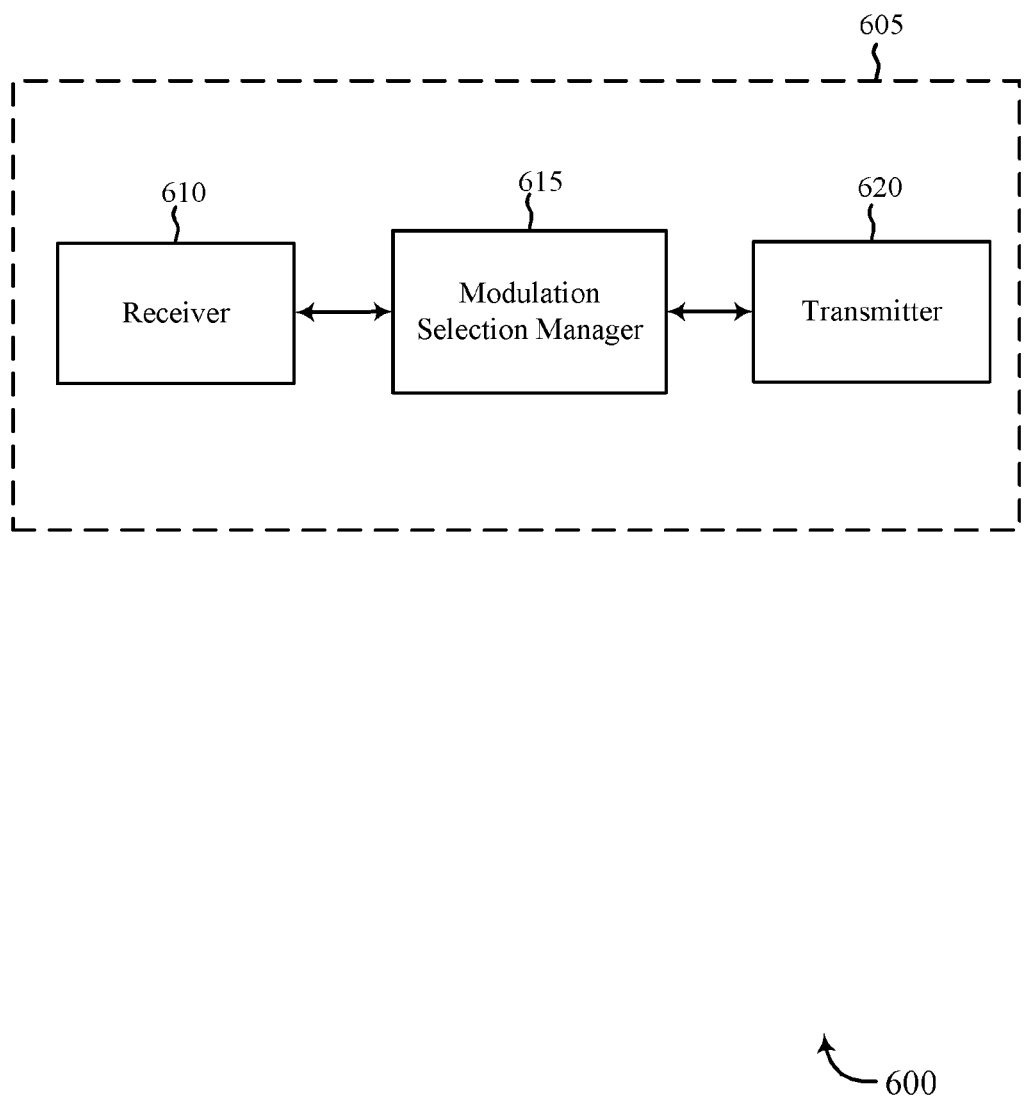
FIG. 6 shows a block diagram of a device configured for use in wireless communication, in accordance with various aspects of the present disclosure.

FIG. 6 shows a block diagram 600 of a device 605 for use in wireless communication, in accordance with various aspects of the present disclosure. The device 605 may be an example of one or more aspects of a UE 115, a device 205-405, a transmitting device 505, and/or a receiving device 510, described with reference to FIGS. 1 through 5. The device 605 may include a receiver 610, a modulation selection manager 615, and/or a transmitter 620. The device 605 may also be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver 610 may receive information such as packets, user data, and/or control information associated with various information channels (e.g., control channels, data channels, etc.). The receiver module 610 may be configured to receive information related to orthogonal BPSK modulation. Information may be passed on to the modulation selection manager 615, and to other components of the device 605.

The modulation selection manager 615 may monitor, control, provide a means for, or otherwise manage aspects of modulation selection for the device 605. When the device 605 is configured as a transmitting device, the modulation selection manager 615 may select a modulation technique from a set of available modulation techniques. Example modulation techniques from the set of available modulation techniques may include, but are not limited to, orthogonal BPSK modulation, OQPSK modulation, QAM modulation, etc.

In one example where device 605 is a transmitting device, modulation selection manager 615 may modulate a first binary sequence using BPSK on a first axis of a complex plane; modulate a second binary sequence using BPSK on a second axis of the complex plane, where the first axis and the second axis are substantially orthogonal; and transmit the first binary sequence and the second binary sequence based at least in part on the modulation of the first binary sequence and the second binary sequence.

In one example where device 605 is a transmitting device, modulation selection manager 615 may modulate a binary sequence using OQPSK; smooth the modulated binary sequence using a FIR filter; and transmit the binary sequence based at least in part on the modulation and smoothing.

In one example where device 605 is a receiving device, modulation selection manager 615 may receive a first binary sequence modulated using BPSK on a first axis of a complex plane; receive a second binary sequence modulated using BPSK on a second axis of the complex plane, where the first axis and the second axis are substantially orthogonal; and demodulate the first binary sequence and the second binary sequence based at least in part on the modulation of the first binary sequence and the second binary sequence.

The transmitter 620 may transmit the one or more signals received from other components of the device 605. The transmitter 620 may transmit signals related to orthogonal BPSK modulation techniques. In some examples, the transmitter 620 may be collocated with the receiver 610 in a transceiver module.

Figure 7:
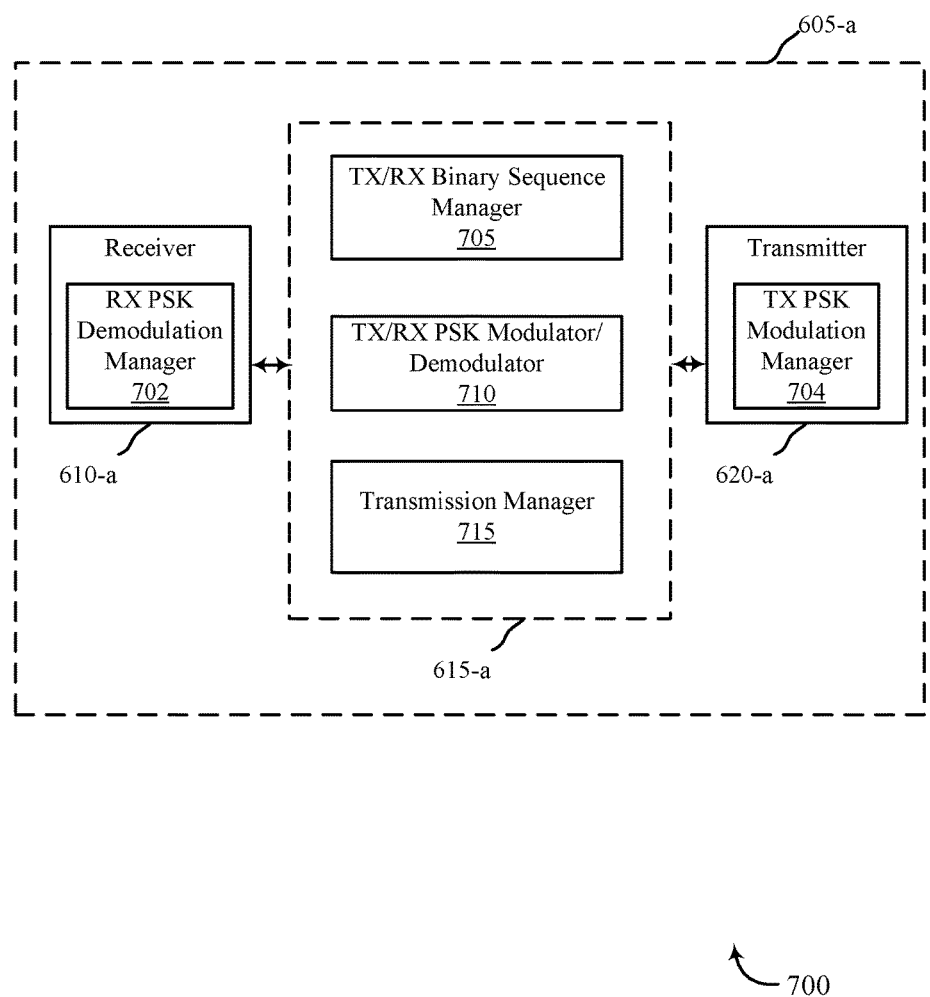
FIG. 7 shows a block diagram of a device configured for use in wireless communication, in accordance with various aspects of the present disclosure.

FIG. 7 shows a block diagram 700 of a device 605-*a* for use in wireless communication, in accordance with various examples. The device 605-*a* may be an example of one or more aspects of a UE 115, a device 205-405, a transmitting device 505, and/or a receiving device 510 described with reference to FIGS. 1 through 5. It may also be an example of a device 605 described with reference to FIG. 6. The device 605-*a* may include a receiver 610-*a*, a modulation selection manager 615-*a*, and/or a transmitter 620-*a*, which may be examples of the corresponding modules of device 605. The device 605-*a* may also include a processor (not shown). Each of these components may be in communication with each other. The modulation selection manager 615-*a* may include a binary sequence manager 705, a PSK modulator/demodulator, and/or a transmission manager 715. The receiver 610-*a* may include a receive PSK demodulation manager 702 and the transmitter 620-*a* may include a transmit PSK modulation manager 704. The receiver 615-*a* and the transmitter 720-*a* may perform the functions of the receiver 610 and the transmitter 620, of FIG. 6, respectively.

It is to be understood that the binary sequence manager 705, the PSK modulator/demodulator 710, and the transmission manager 715 may be configured to support different functions dependent upon whether the device 605-*a* is acting as a transmitting device or a receiving device. Moreover, some or all of the functions of the binary sequence manager 705, the PSK modulator/demodulator 710, and/or the transmission manager 715 may be performed by the receive PSK demodulation manager 702 (when device 605-*a* is acting as a receiving device) and/or by transmit PSK modulation manager 704 (when device 605-*a* is acting as a transmitting device). Thus, certain functions of the binary sequence manager 705, the PSK modulator/demodulator 710, and/or the transmission manager 715 may be implemented and/or performed by the receiver and/or transmitter components of the device 605-*a*, depending on the context.

The binary sequence manager 705 may monitor, control, provide a means for, or otherwise manage one or more aspects of a binary sequence for the device 605-*a*. For example, the binary sequence manager 705 may obtain a first binary sequence and a second binary sequence from a single binary stream. The first binary sequence may include a set of even bits in the single binary stream and the second binary sequence may include a set of odd bits in the single binary stream. The binary sequence manager 705 may map the first binary sequence to a first axis of a complex plane and map the second binary sequence to a second axis of the complex plane. The first axis may be a real axis and the second axis may be an imaginary axis of the complex plane. The first axis may be an imaginary axis and the second axis may be a real axis of the complex plane. The first axis and the second axis may be substantially orthogonal with respect to each other. In some examples, the first axis may be orthogonal to the second axis by a ninety degree phase shift.

In some aspects, binary sequence manager 705 may apply a CP to the first binary sequence and the second binary sequence. The CP may be applied based at least in part on a common block size for the first binary sequence and the second binary sequence. The CP may be applied prior to modulating the first binary sequence and the second binary sequence. The CP may be applied dynamically.

In some aspects where the device 605-*a* is configured as a receiving device, binary sequence manager 705 may receive the first binary sequence modulated using BPSK on the first axis of the complex plane and receive the second binary sequence modulated using BPSK on the second axis of the complex plane. The first axis and the second axis may be substantially orthogonal. Binary sequence manager 705 may combine the demodulated first binary sequence and second binary sequence into a single binary stream. The first binary sequence may include a set of even bits of the single binary stream and the second binary sequence may include a set of odd bits in the single binary stream.

The PSK modulator/demodulator 710 may monitor, control, provide a means for, or otherwise manage one or more aspects of a PSK modulation for the device 605-*a*. For example, the PSK modulator/demodulator 710 may modulate the first binary sequence using BPSK on the first axis the complex plane and modulate the second binary sequence using BPSK on the second axis of the complex plane. Modulating the first binary sequence on the first axis and modulating the second binary sequence on the second axis may include limiting an incremental phase shift between the first binary sequence and the second binary sequence to below a threshold level. In some examples, the threshold level may include a ninety degrees phase shift.

In some aspects, PSK modulator/demodulator 710 may modulate a binary sequence using an phase shift keying. The phase shift keying may include an OQPSK, an offset PSK, a binary PSK, a quadrature PSK, a rotated PSK (e.g., Pi/2=BPSK), etc.

In some aspects where the device 605-*a* is configured as a receiving device, the PSK modulator/demodulator 710 may demodulate the first binary sequence and the second binary sequence based at least in part on the modulation, e.g., the orthogonal BPSK modulation and/or the OQPSK modulation.

The transmission manager 715 may monitor, control, provide a means for, or otherwise manage one or more aspects of transmission for the device 605-*a*. For example, the transmission manager 715 may transmit the first binary sequence and the second binary sequence based at least in part on the modulation of the first binary sequence and the second binary sequence, e.g., based on the orthogonal BPSK modulation and/or the OQPSK modulation. In some aspects, the transmission manager 715 may smooth the modulated first binary sequence and the modulated second binary sequence using a FIR filter prior to transmission.

Figure 8:
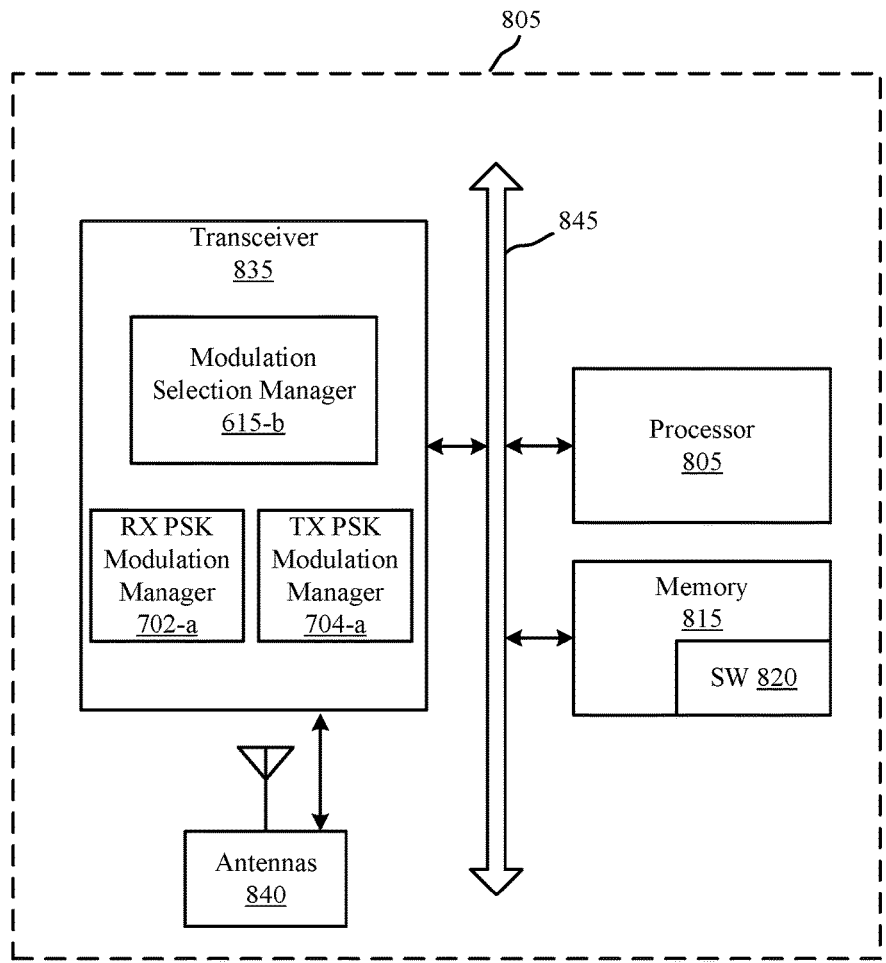
FIG. 8 shows a block diagram of a wireless communication system, in accordance with various aspects of the present disclosure.

FIG. 8 shows a system 800 for use in wireless communication, in accordance with various examples. System 800 may include a device 805, which may be an example of the UEs 115, devices 205-405, a transmitting device 505, and/or a receiving device 510 of FIGS. 1 through 5. Device 805 may also be an example of one or more aspects of devices 605 of FIGS. 6 and 7.

The device 805 may generally include components for bi-directional voice and data communications including components for transmitting communications and components for receiving communications. The device 805 may include antenna(s) 840, a transceiver 835, a processor 805, and memory 815 (including software (SW) 820), which each may communicate, directly or indirectly, with each other (e.g., via one or more buses 845). The transceiver 835 may be configured to communicate bi-directionally, via the antenna(s) 840 and/or one or more wired or wireless links, with one or more networks, as described above. For example, the transceiver 835 may be configured to communicate bi-directionally with base stations 105 with reference to FIG. 1. The transceiver 835 may include a modem configured to modulate the packets and provide the modulated packets to the antenna(s) 840 for transmission, and to demodulate packets received from the antenna(s) 840. While the device 805 may include a single antenna 840, the device 805 may have multiple antennas 840 capable of concurrently transmitting and/or receiving multiple wireless transmissions. The transceiver 835 may be capable of concurrently communicating with one or more base stations 105 via multiple component carriers.

The transceiver 835 may include a modulation selection manager 615-*b*, which may perform the functions described above for the modulation selection manager 615 of device 605 of FIGS. 6 and 7. The transceiver 835 may also include a receive PSK modulation manager 702-*a* and a transmit PSK modulation manager 704-*a*, which may perform the functions of the receive PSK modulation manager 702 and the transmit PSK modulation manager 704, respectively, described with reference to FIG. 7.

The memory 815 may include random access memory (RAM) and read-only memory (ROM). The memory 815 may store computer-readable, computer-executable software/firmware code 820 containing instructions that are configured to, when executed, cause the processor 805 to perform various functions described herein (e.g., orthogonal BPSK modulation, etc.). Alternatively, the computer-readable, computer-executable software/firmware code 820 may not be directly executable by the processor 805 but be configured to cause a computer (e.g., when compiled and executed) to perform functions described herein. The processor 805 may include an intelligent hardware device, e.g., a central processing unit (CPU), a microcontroller, an application-specific integrated circuit (ASIC), etc.

Figure 9:
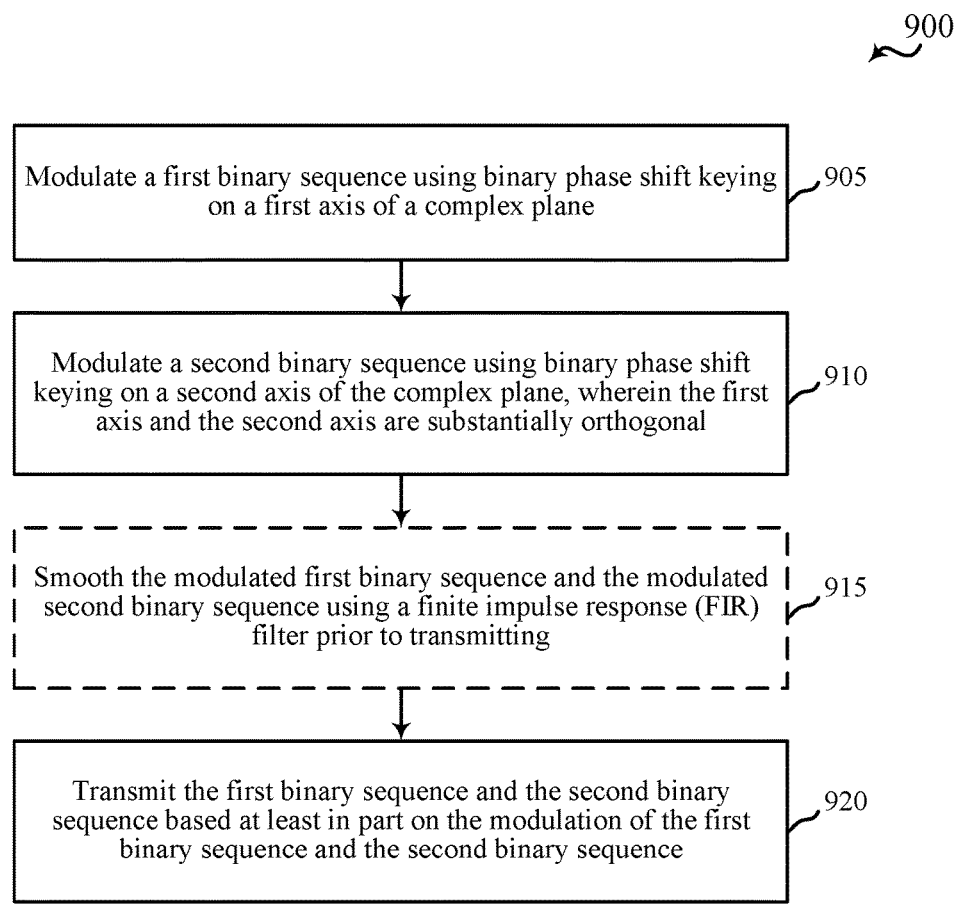
FIGS. 9 through 11 are flow charts illustrating an example of a method for wireless communication, in accordance with various aspects of the present disclosure.

FIG. 9 shows a flowchart illustrating a method 900 for orthogonal BPSK modulation in accordance with various aspects of the present disclosure. The operations of method 900 may be implemented by a device such as a UE 115, a device 205-405, a transmitting device 505, or a device 605, or its components, as described with reference to FIGS. 1 through 7. For example, the operations of method 900 may be performed by the modulation selection manager as described herein. In some examples, the device may execute a set of codes to control the functional elements of the device to perform the functions described below. Additionally or alternatively, the device may perform aspects the functions described below using special-purpose hardware.

At block 905, the device may modulate a first binary sequence using BPSK on a first axis of a complex plane as described above with reference to FIGS. 2 through 7. In certain examples, the operations of block 905 may be performed by the modulation selection manager as described with reference to FIGS. 6 and 7.

At block 910, the device may modulate a second binary sequence using BPSK on a second axis of a complex plane, the first axis and the second axis being substantially orthogonal as described above with reference to FIGS. 2 through 7. In certain examples, the operations of block 910 may be performed by the modulation selection manager as described with reference to FIGS. 6 and 7.

At block 915, the device may optionally smooth the modulated first binary sequence and the modulated second binary sequence using a FIR filter prior to transmission as described above with reference to FIGS. 2 through 7. In certain examples, the operations of block 920 may be performed by the modulation selection manager as described with reference to FIGS. 6 and 7.

At block 920, the device may transmit the first binary sequence and the second binary sequence based at least in part on the modulation of the first binary sequence and the second binary sequence as described above with reference to FIGS. 2 through 7. In certain examples, the operations of block 920 may be performed by the modulation selection manager as described with reference to FIGS. 6 and 7.

Figure 10:
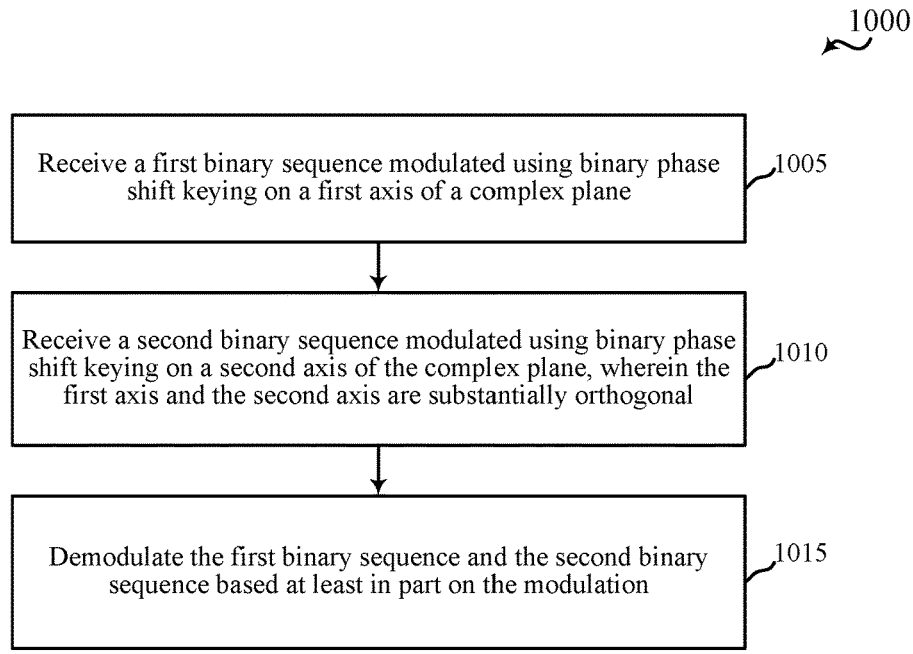

FIG. 10 shows a flowchart illustrating a method 1000 for orthogonal BPSK modulation in accordance with various aspects of the present disclosure. The operations of method 1000 may be implemented by a device such as a UE 115, a device 205-405, a transmitting device 505, or a device 605, or its components, as described with reference to FIGS. 1 through 7. For example, the operations of method 1000 may be performed by the modulation selection manager as described herein. In some examples, the device may execute a set of codes to control the functional elements of the device to perform the functions described below. Additionally or alternatively, the device may perform aspects the functions described below using special-purpose hardware.

At block 1005, the device may receive a first binary sequence modulated using BPSK on a first axis of a complex plane as described above with reference to FIGS. 2 through 7. In certain examples, the operations of block 1005 may be performed by the modulation selection manager as described with reference to FIGS. 6 and 7.

At block 1010, the device may receive a second binary sequence modulated using BPSK on a second axis of a complex plane, the first axis and the second axis being substantially orthogonal as described above with reference to FIGS. 2 through 7. In certain examples, the operations of block 1010 may be performed by the modulation selection manager as described with reference to FIGS. 6 and 7.

At block 1015, the device may demodulate the first binary sequence and the second binary sequence based at least in part on the modulation as described above with reference to FIGS. 2 through 7. In certain examples, the operations of block 1015 may be performed by the modulation selection manager as described with reference to FIGS. 6 and 7.

Figure 11:
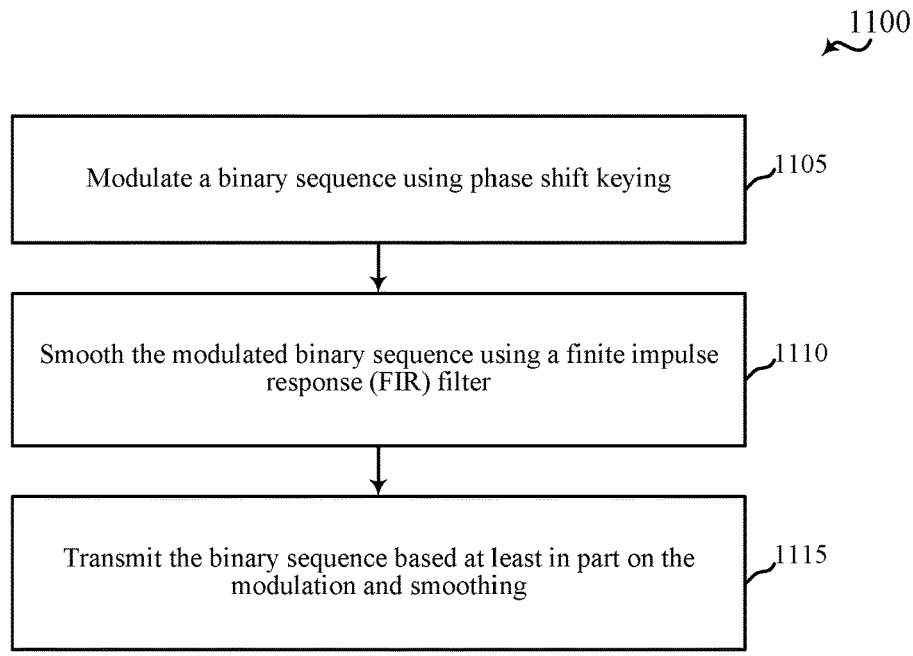

FIG. 11 shows a flowchart illustrating a method 1100 for OQPSK modulation in accordance with various aspects of the present disclosure. The operations of method 1100 may be implemented by a device such as a UE 115, a device 205-405, a transmitting device 505, or a device 605, or its components, as described with reference to FIGS. 1 through 7. For example, the operations of method 1100 may be performed by the modulation selection manager as described herein. In some examples, the device may execute a set of codes to control the functional elements of the device to perform the functions described below. Additionally or alternatively, the device may perform aspects the functions described below using special-purpose hardware.

At block 1105, the device may modulate a binary sequence modulated using offset PSK as described above with reference to FIGS. 2 through 7. In certain examples, the operations of block 1105 may be performed by the modulation selection manager as described with reference to FIGS. 6 and 7.

At block 1110, the device may smooth the modulated binary sequence using a FIR filter as described above with reference to FIGS. 2 through 7. In certain examples, the operations of block 1110 may be performed by the modulation selection manager as described with reference to FIGS. 6 and 7.

At block 1115, the device may transmit the binary sequence based at least in part on the modulation and smoothing as described above with reference to FIGS. 2 through 7. In certain examples, the operations of block 1115 may be performed by the modulation selection manager as described with reference to FIGS. 6 and 7.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for relaying based on service-type indicator and network availability.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for relaying based on service-type indicator and network availability. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:
1. A method for wireless communication, comprising:
modulating a first binary sequence using binary phase shift keying (BPSK) on a first axis of a complex plane;
modulating a second binary sequence using BPSK on a second axis of the complex plane, wherein the first axis and the second axis are substantially orthogonal;

determining whether to omit or insert a cyclic prefix from the first and second binary sequences based at least in part on whether a capability of a receiving device supports receiving the first and second binary sequences without the cyclic prefix;

omitting or inserting the cyclic prefix according to the capability of the receiving device; and transmitting the first binary sequence and the second binary sequence based at least in part on the modulation of the first binary sequence and the second binary sequence.

2. The method of claim 1, further comprising:
smoothing the modulated first binary sequence and the modulated second binary sequence using a finite impulse response (FIR) filter prior to transmitting.

3. The method of claim 1, wherein modulating the first binary sequence on the first axis and modulating the second binary sequence on the second axis comprise:
limiting an incremental phase shift between the first binary sequence and the second binary sequence to below a threshold level.

4. The method of claim 3, wherein the threshold level comprises a ninety degrees phase shift.

5. The method of claim 1, wherein the first axis comprises a real axis and the second axis comprises an imaginary axis.

6. The method of claim 1, wherein the first axis comprises an imaginary axis and the second axis comprises a real axis.

7. The method of claim 1, further comprising:
obtaining the first binary sequence and the second binary sequence from a single binary stream.

8. The method of claim 7, wherein the first binary sequence comprises a set of even bits in the single binary stream and the second binary sequence comprises a set of odd bits in the single binary stream.

9. A method for wireless communication, comprising:
modulating a first binary sequence and a second binary sequence using binary phase shift keying (BPSK), wherein the first binary sequence and the second binary sequence are modulated on different axes of a complex plane;

determining whether to omit or insert a cyclic prefix from the first and second binary sequences based at least in part on whether a capability of a receiving device supports receiving the first and second binary sequences without the cyclic prefix;

omitting or inserting the cyclic prefix according to the capability of the receiving device;

smoothing the modulated first and second binary sequences using a finite impulse response (FIR) filter; and transmitting the first and second binary sequences based at least in part on the modulation and smoothing.

10. The method of claim 9, wherein determining whether to omit or insert the cyclic prefix occurs prior to modulating the first and second binary sequences.

11. An apparatus for wireless communication, comprising:
a processor;
a memory in electronic communication with the processor; and
instructions stored in the memory, the instructions being executable by the processor to:
modulate a first binary sequence using binary phase shift keying (BPSK) on a first axis of a complex plane;
modulate a second binary sequence using BPSK on a second axis of the complex plane, wherein the first axis and the second axis are substantially orthogonal;

determine whether to omit or insert a cyclic prefix from the first and second binary sequences based at least in part on whether a capability of a receiving device supports receiving the first and second binary sequences without the cyclic prefix;

omit or insert the cyclic prefix according to the capability of the receiving device, and transmit the first binary sequence and the second binary sequence based at least in part on the modulation of the first binary sequence and the second binary sequence.

12. The apparatus of claim 11, further comprising instructions executable by the processor to:
smooth the modulated first binary sequence and the modulated second binary sequence using a finite impulse response (FIR) filter prior to transmitting.

13. The apparatus of claim 11, wherein determining whether to omit or insert the cyclic prefix occurs prior to modulating the first binary sequence and the second binary sequence.

14. The apparatus of claim 11, wherein modulating the first binary sequence on the first axis and modulating the second binary sequence on the second axis comprise instructions executable by the processor to:
limit an incremental phase shift between the first binary sequence and the second binary sequence to below a threshold level.

15. The apparatus of claim 14, wherein the threshold level comprises a ninety degrees phase shift.

16. The apparatus of claim 11, wherein the first axis comprises a real axis and the second axis comprises an imaginary axis.

17. The apparatus of claim 11, wherein the first axis comprises an imaginary axis and the second axis comprises a real axis.

18. The apparatus of claim 11, further comprising instructions executable by the processor to:
obtain the first binary sequence and the second binary sequence from a single binary stream.

19. The apparatus of claim 18, wherein the first binary sequence comprises a set of even bits in the single binary stream and the second binary sequence comprises a set of odd bits in the single binary stream.

20. An apparatus for wireless communication, comprising:
a processor;
a memory in electronic communication with the processor; and
instructions stored in the memory, the instructions being executable by the processor to:
modulate a first binary sequence and a second binary sequence using binary phase shift keying (BPSK);
determine whether to omit or insert a cyclic prefix from the first and second binary sequences based at least in part on whether a capability of a receiving device supports receiving the first and second binary sequences without the cyclic prefix;
omit or insert the cyclic prefix according to the capability of the receiving device;
smooth the modulated first and second binary sequences using a finite impulse response (FIR) filter; and
transmit the first and second binary sequences based at least in part on the modulation and smoothing.

21. The apparatus of claim 20, wherein determining whether to omit or insert the cyclic prefix occurs prior to modulating the first and second binary sequences.

* * * * *